April 9, 1929.  M. C. SPENCER  1,708,910

MEANS FOR OPERATING POLYPHASE MOTORS FROM A SINGLE-PHASE SOURCE

Original Filed March 1, 1927

Inventor, Millard Cole Spencer,
By Samuel W. Balch
Attorney.

Patented Apr. 9, 1929.

1,708,910

UNITED STATES PATENT OFFICE.

MILLARD COLE SPENCER, OF EAST ORANGE, NEW JERSEY, ASSIGNOR TO CROCKER-WHEELER ELECTRIC MANUFACTURING COMPANY, OF AMPERE, NEW JERSEY, A CORPORATION OF NEW JERSEY.

MEANS FOR OPERATING POLYPHASE MOTORS FROM A SINGLE-PHASE SOURCE.

Original application filed March 1, 1927, Serial No. 171,763. Divided and this application filed August 13, 1927. Serial No. 212,705.

This application is a division of my copending application filed March 1, 1927, Serial No. 171,763.

More specifically the purpose of this invention is to provide means for supplying from a single-phase source the two windings of a two-phase motor which are displaced ninety electrical degrees with respect to each other, the current in one of the windings being displaced in phase with respect to the current in the other winding by means of a condenser.

An object of this invention is to provide a large effective capacity in series in one of the windings without employing a condenser for the purpose of correspondingly large capacity. A further object is to provide a construction, by suitably proportioning the windings, such that the current in one winding will lag in phase behind the impressed voltage by a material amount, and the current in the other winding, due to the condenser effect, will lead in phase ahead of the impressed voltage by the same amount, whereby a unity power factor is obtained. A further object is to obtain the full output of a two-phase motor by making each of the displacements in phase equal to forty-five degrees, whereby the currents in the two windings are brought into ninety-degree relation. A further object is to provide means for obtaining a high effective capacity in series with the winding which is advanced in phase when the motor is starting and to cut down the effective capacity automatically without using auxiliary moving parts when the motor comes up to speed so as to obtain the ninety-degree phase displacement between the currents in the two windings and to have the unity power factor.

In the accompanying sheet of drawings which forms a part of this description,

Figure 1:
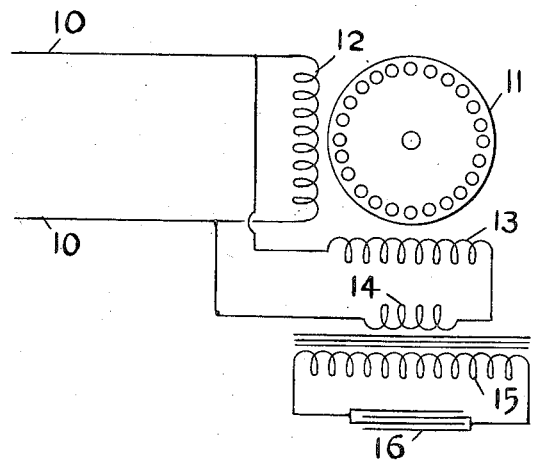
Figure 1 shows diagrammatically a squirrel-cage motor provided with windings and supplied with current in accordance with this invention in which the current in one of the motor windings is displaced in phase by means of a transformer connected to a condenser.

As shown in Fig. 1, leads 10, 10 are a source of single-phase current supply for a two-phase alternating-current motor with a squirrel-cage rotor 11. The motor is provided with two windings, the first of which 12 is connected directly to the source of supply, and the current therein lags in phase with respect to the voltage of the source due to the reactance of its winding. The second motor winding 13 is displaced in position ninety electrical degrees with respect to the first winding, and is connected to the source of supply in series with the primary winding 14 of a transformer. The secondary winding 15 of this transformer is connected to a condenser 16. It is not essential that the transformer should be a step-up transformer or that the windings should be independent. The condenser operates to advance the phase of the current in the second motor winding with respect to the voltage of the source. The transformer is a step-up transformer from the motor-winding circuit to the condenser circuit, thereby impressing a high voltage on the condenser and permitting the use of a condenser of small capacity. The effective capacity introduced into the primary circuit of a transformer by a condenser connected across its secondary winding is proportional to the square of the ratio of the transformation.

The first motor winding, which is directly connected to the source of current supply, is so proportioned that its power factor at full load will be 0.707 and the current will then lag forty-five degrees behind the voltage of the source of supply. The current in the second motor winding is caused to lead the line voltage forty-five degrees by means of the transformer and condenser. The two currents, therefore, differ in phase by ninety degrees and the motor operates as a true two-phase motor. The two currents in the two motor windings combine in the line to form a resultant current drawn from the source which is in phase with the voltage of the source, thereby drawing power from the source at unity power factor.

Each of the two motor windings has a fewer number of turns and the core has a higher saturation than is usual for a two-phase motor of the standard type.

A much larger effective condenser capacity is required in series in the second motor winding at starting than is required when the motor is at full speed in order to keep the phases of the currents in the two motor windings properly displaced. If a transformer of normal design is used with a condenser which is correct for full load at normal speed then the motor will have little or no starting torque. If a condenser of large enough capacity to give the motor a good starting torque is used then the efficiency of the motor at full load will be very poor, only about twenty-five or thirty per cent, and the power factor will also be low.

It has, however, been found possible, by means of a transformer of special design, to give the motor a good starting torque with little or no sacrifice in the performance of the motor when it is up to speed. This result can be obtained by using a large enough condenser to give the motor a good starting torque and then automatically cutting down the effective capacity of the condenser as the motor comes up to speed. This result is accomplished by neutralizing a part of the leading current drawn by the condenser by the increased magnetizing current of the transformer. This is made possible by the fact that the voltage across the primary of the transformer rises as the motor comes up to speed. This rise in voltage across the primary of the transformer is made use of to greatly increase the magnetizing current drawn by the transformer and this neutralizes a large portion of the leading current drawn by the condenser when the motor is running.

Figure 2:
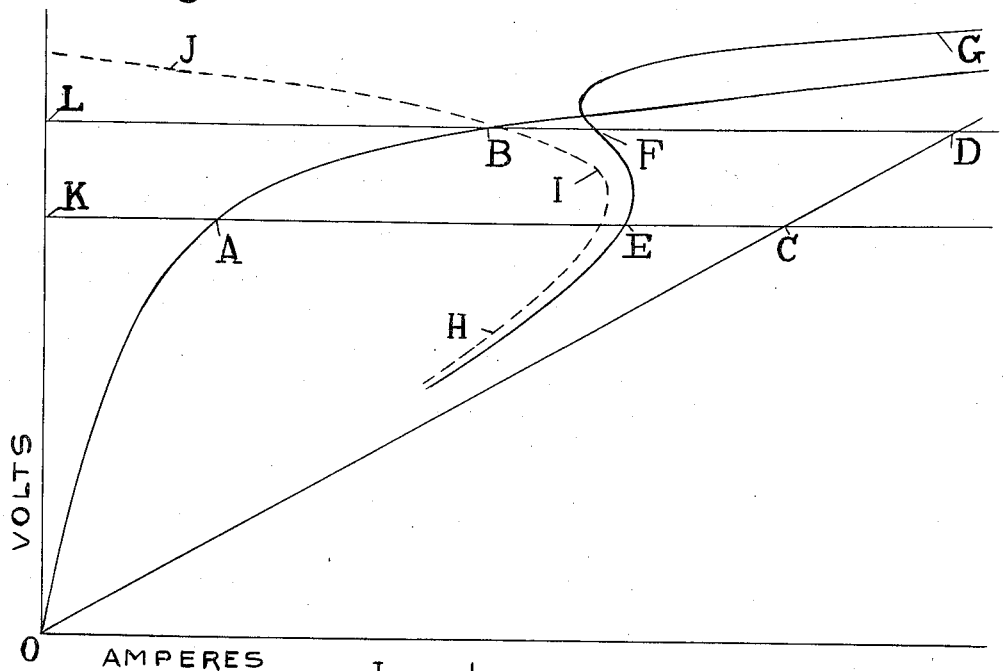
Fig. 2 is a curve diagram showing the saturation curve of the transformer, the curve of the current drawn by the condenser, and the curve of the resultant primary current.

Referring to Fig. 2, the curve OAB is the so-called saturation curve of the transformer. It represents the current drawn by the transformer with various voltages across its primary winding with the secondary circuit open. When the exception of a small power component this current represents the magnetizing current of the transformer which lags ninety degrees behind the impressed voltage. The curve OCD represents the current drawn by the condenser with the various voltages across the primary of the transformer. This current is expressed in primary terms, that is, it is the actual condenser current multiplied by the ratio of the transformation of the transformer. This condenser current leads the impressed voltage by ninety degrees. As the magnetizing current lags behind the voltage by ninety degrees and the condenser current leads the voltage by ninety degrees the resultant primary current is equal to their difference. The curve EFG shows the resultant primary current as obtained by measurements. Up to the point F it is nearly equal to the condenser current minus the magnetizing current which is shown by the dotted curve HIJ. Beyond about the point F this relation does not hold due to the change in wave shape and other factors. It is evident from these curves that as the voltage across the primary of the transformer is increased from K to L that the effective condenser current instead of increasing from C to D, due to the neutralizing effect of the magnetizing current of the transformer, decreases from E to F. As the effective condensive reactance in the primary circuit is equal to the primary voltage divided by the resultant condenser current, the effective condensive reactance automatically decreases as the voltage rises. The transformer is so proportioned that at the voltage K across the primary, when the motor is starting, it will draw a magnetizing current KA, that is, so that its core will be working at or just below the knee A of its magnetization curve. Then when the voltage across the primary of the transformer rises to the point L as the motor comes up to speed, the transformer will draw the greatly increased magnetizing current LB and will reduce the resultant condenser current from LD to LF. In this way the effective condensive reactance in series with one of the motor windings is automatically reduced as required as the motor comes up to speed.

I claim:—

A two-phase alternating-current motor supplied from a single-phase source, a condenser, a transformer with a primary winding in series with one of the motor windings and a secondary winding connected to the condenser, and an iron core for the transformer proportioned to work below the knee of the magnetization curve at the voltage across the primary winding of the transformer when the motor is starting, and proportioned to work above the knee of the magnetization curve at the voltage across the primary winding of the transformer when the motor is up to speed, whereby the increased magnetizing current drawn by the transformer at the increased voltage across its primary winding when the motor is up to speed will neutralize a greater portion of the leading current drawn by the condenser and thereby decrease the effective capacity of the motor circuit.

MILLARD COLE SPENCER.